Dec. 1, 1959   F. J. BRADBURY   2,915,047
SERVO-DEVICES OF THE DIFFERENTIAL AIR PRESSURE TYPE
Filed June 10, 1957   3 Sheets-Sheet 1

Inventor
Frederick James Bradbury
by Stevens, Davis, Miller & Mosher
his attorneys Dec. 1, 1959    F. J. BRADBURY    2,915,047
SERVO-DEVICES OF THE DIFFERENTIAL AIR PRESSURE TYPE
Filed June 10, 1957    3 Sheets-Sheet 2
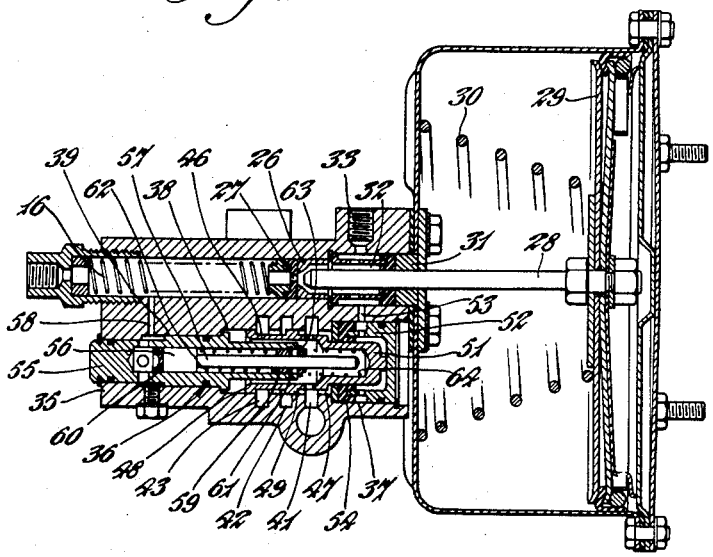
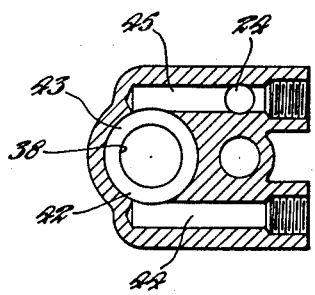

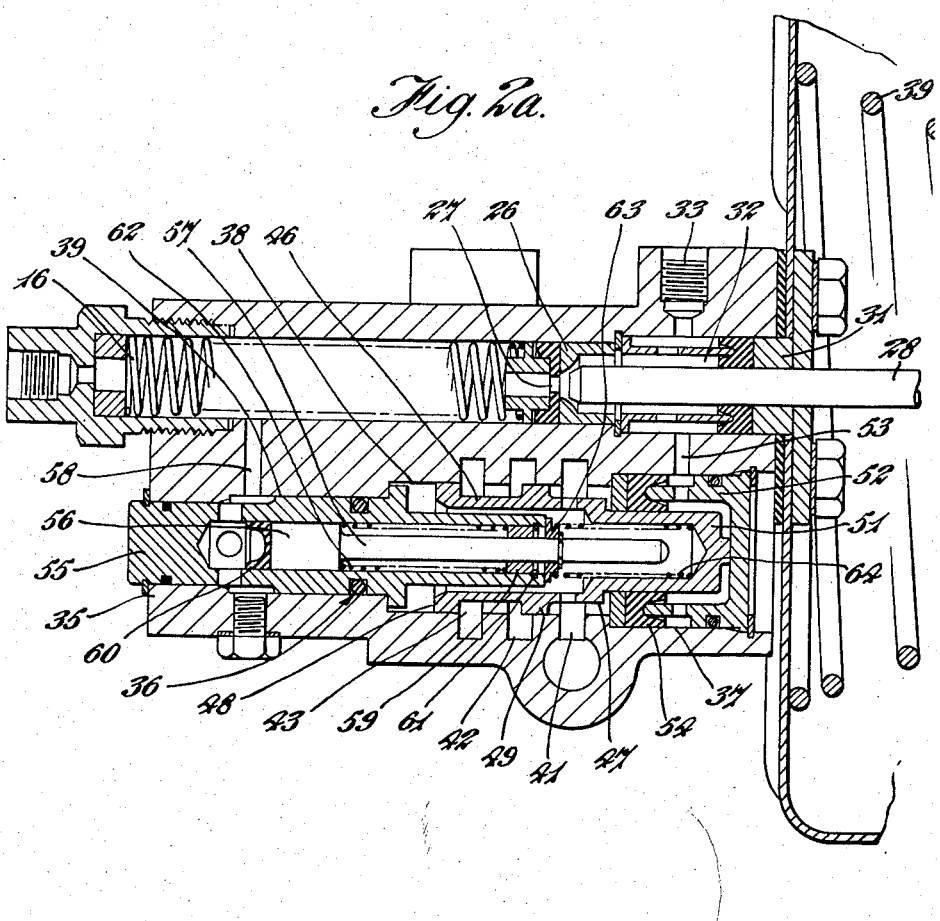

United States Patent Office 2,915,047
Patented Dec. 1, 1959

2,915,047

SERVO-DEVICES OF THE DIFFERENTIAL AIR PRESSURE TYPE

Frederick James Bradbury, Leamington Spa, England, assignor to Automotive Products Company Limited, Leamington Spa, England, a British company Application June 10, 1957, Serial No. 664,615

Claims priority, application Great Britain June 20, 1956

4 Claims. (Cl. 121—46.5)

This invention relates to servo-devices of the differential air pressure type. Servo-devices of this type are commonly used in association with liquid pressure systems, such as liquid pressure braking systems, to augment the pressure exerted by an operator on a foot pedal or equivalent operating member, thus reducing the effort which the operator must exert to effect a given degree of braking.

The invention is concerned with servo-devices in which a piston is movable in a cylinder both ends of which are normally connected to a source of suction, one end being isolated from the source of suction and connected to the atmosphere when the servo-device is required to operate. It is well known to combine such servo-devices with a liquid pressure system including an operator-operated master cylinder, a servo-operated master cylinder and brake operating motor cylinders, the servo-operated master cylinder including a piston formed with an aperture which, when the servo-device is inoperative, provides a direct connection between the operator-operated master cylinder and the motor cylinders, the aperture being closed when the servo-device becomes operative to move the piston. The servo-device is controlled by a valve operated by the pressure produced in the operator-operated master cylinder. Such a combination of a servo-device and a liquid pressure system is hereinafter referred to as "a servo-assisted liquid pressure system" of the kind referred to.

Many forms of valve for controlling the servo-device have been proposed, and, with a large number of them, it has been found that a substantial pressure must be built up in the system by the operator-operated master cylinder before the servo-device comes into action, so that the operator must exert substantial pressure to initiate a brake operation, and, when the servo-device comes into action, the pressure he must exert suddenly drops to a much lower value, making control of the degree of braking difficult.

The object of the present invention is to provide a control valve which is operable by a relatively low pressure so that the servo-device is brought into operation whilst the liquid pressure in the system is at a low value.

According to the invention, a valve for controlling the servo-device of a servo-assisted liquid pressure system of the kind referred to comprises a piston-type slide valve spool adapted to be urged in a direction to effect operation of the servo-device by liquid pressure produced in the operator-operated master cylinder, a reaction plunger responsive to pressure produced in the servo-operated master cylinder to apply a thrust to the slide valve spool in the opposite direction, a light spring acting between the slide valve spool and the reaction plunger, and a stronger spring acting on the reaction plunger to oppose the liquid pressure acting thereon, the arrangement being such that the movement of the slide valve spool to effect operation of the servo-device is opposed only by the light spring until sufficient pressure is built up in the servo-operated master cylinder to overcome the stronger spring.

Thus the effort necessary to bring the servo-device into operation is determined solely by the light spring, the strength of which need be sufficient only to return the slide valve against friction resistance of any packings which may be used and against the head of liquid in the system.

The invention is hereinafter described with reference to the accompanying drawings, in which:

Figure 2 is a sectional elevation, taken on the line 2—2 of Figure 1, of the servo-device;

Figure 2A is a sectional elevational view, on a larger scale, of the servo-operated master cylinder and valve shwn in Figure 2; and Figure 3 is a transverse section of the servo-device taken on the line 3—3 of Figure 1.

Figure 1:
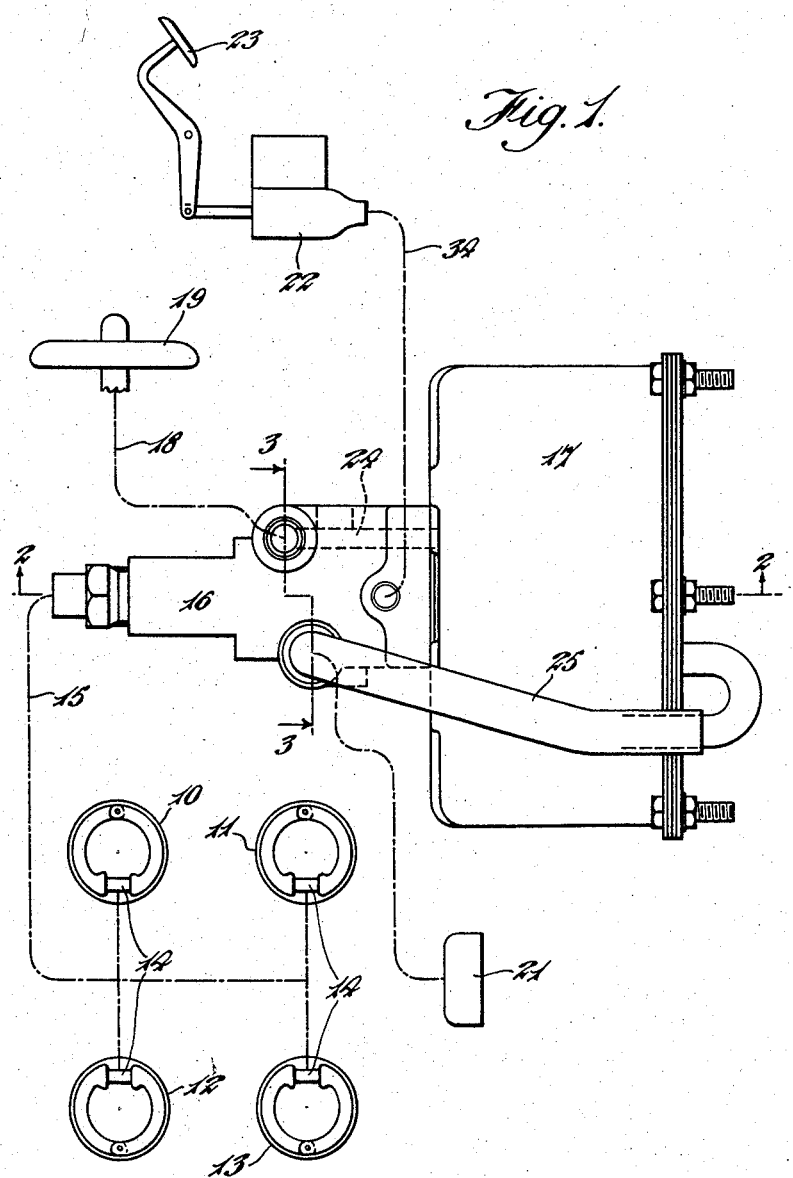
Figure 1 is a diagram of a servo-assisted liquid pressure braking system the servo-device of which embodies a valve according to the invention, the servo-device being shown in plan.

Referring to Figure 1 of the drawings, the servo-assisted liquid pressure braking system comprises wheel brakes 10, 11, 12 and 13 operated by motor cylinders 14 all of which are connected to a conduit 15 leading from the outlet of a servo-operated master cylinder 16 mounted on one end of a servo-cylinder 17. The servo-cylinder 17 is of the vacuum-suspended type, both ends thereof being normally connected through a conduit 18, to a source of suction such as the inlet manifold 19 of the engine of the vehicle on which the braking system is mounted, the connection of the rear chamber of the servo-cylinder to the vacuum source, or to the atmosphere through an air inlet 21, being controlled by a valve hereinafter described, the valve being operated by liquid pressure produced in an operator-operated master cylinder 22 shown as being connected to a foot-pedal 23. The front chamber of the servo motor is permanently connected to the manifold 19 through the passage 24 shown in dotted lines in Figure 1, and an external conduit 25 leads from the valve to the rear chamber of the servo-motor.

As shown in Figures 2 and 2A the piston 26 of the servo-operated master cylinder 16 is formed with an aperture 27 which is closed, when the servo-motor is operated, by a thrust rod 28 fixed to the piston 29 of the servo-motor. The rear end of the master cylinder 16 is closed by a partition 31 through which the thrust rod 28 passes, to provide a space 32 of variable volume behind the piston 26, which space is connected by a passage 33 and conduit 34 (Figure 1) to the master cylinder 22. The piston 29 is urged rearwardly by a spring 30.

The servo-operated master cylinder 16 is formed by a bore in a body 35 in which there is also formed a second, parallel bore 36 for the valve. The bore 36 is stepped to provide three portions 37, 38 and 39 of different diameters, the largest portion 37 being at the rear end and the smallest portion 39 at the front end. The intermediate portion 38 of this bore 36 is formed with three axially spaced circumferential grooves 41, 42 and 43, of which the rearmost 41 is connected to the air inlet 21 the intermediate one 42 is connected by a passage 44 and the conduit 25 to the end of the servo-cylinder 17 to which atmospheric air is admitted to operate the said device, and the foremost groove 43 to the inlet manifold 19 through a passage 45 and the conduit 18. The passage 24 branches from the passage 45 and so connects the manifold 19 to the other end of the servo-cylinder. A piston-type slide valve spool 46 slidable in the portion 38 of the bore 36 is of tubular form, the bore therein being closed at its rear end. The valve spool 46 is stepped at 47, the larger-diameter part thereof being formed with two axially spaced flanges 48 and 49 the edges of which form lands engaging the portion 38 of the bore 36. The flanges 48 and 49 are so positioned that, when the valve spool 46 is in its normal position as shown in Figure 2, the groove between them connects the grooves 42 and 43 whilst the flange 49 isolates the groove 41 from the said grooves 42 and 43. When the valve spool 46 is moved forwardly, however, the flange 49 passes across the groove 42 and connects that groove to the groove 41, whilst isolating the groove 43.

The smaller diameter rear end 51 of the slide valve spool 46 projects into a cup-like cylinder 52 housed in the portion 37 of the valve bore 36, the said cylinder 52 being connected to the rear chamber 32 of the master cylinder 16 by a passage 53. A fluid-tight packing 54 in the mouth of the cylinder 52 engages the reduced portion 51 of the valve spool 46.

The portion 39 of the valve bore 36 houses a sleeve-like cylinder 55, closed at its forward end and extending at its rear end into the bore of the valve spool 46. A reaction plunger 56 carrying a cup packing 60 is slidable in the cylinder 55, the plunger 56 being formed with a stem 57 extending towards the closed end of the valve spool 46. The cylinder 55, in front of the reaction plunger 56, is connected with the front end of the bore of the servo-operated master cylinder by a passage 58. An abutment collar 59 retained in position in the rear end of the cylinder 55 by a spring ring 61, engaging a groove in the cylinder wall is engaged by one end of a coiled compression spring 62 surroundng the stem and engaging at its other end with the rear face of the plunger 56. Forward movement of the reaction plunger 56 is limited by a stop collar 63 thereon engaging the rear end of the cylinder 55, and a second compression spring 64 substantially weaker than the spring 62, is disposed between the stop collar 63 and the closed end of the valve spool 46. The spring 62 is partly accommodated in the bore of the valve spool 46, thus reducing the overall length of the valve assembly and could, if further reduction in the length of the assembly were required, be wholly accommodated therein.

The braking system is operated by depressing the pedal 23 to displace liquid from the pedal-operated master cylinder 22, this liquid passing through the aperture 27 in the piston 26 of the servo-operated master cylinder 16. Pressure is thus built up in the whole of the liquid system.

The pressure builds up until it becomes sufficient to move the slide valve spool against the light spring 64 and bring the servo-device into operation. Depending on the relative strengths of the pull-off springs (not shown) which act to retract the brake shoes, and the spring 64, the servo may be brought into operation before or after the shoes contact the drums.

The initial movement of the servo piston 29 causes the thrust rod 28 to close the aperture 27 in the piston of the servo-operated master cylinder 16, and the thrust rod 28 then transmits the thrust produced by the servo-motor to that piston, thus increasing the pressure acting in the motor cylinders 10, 11, 12, 13. This increased pressure acts on the reaction plunger 56, and, when it has reached a value great enough to overcome the stronger spring 62 acting on that plunger, moves the said plunger rearwardly to engage the slide valve spool 46 and move it to a lapped position at which the forces acting on the reaction piston due to the pressure in the master cylinder 22 and the pressure in the master cylinder 16 respectively balance one another and the intermediate groove 42 in the intermediate portion of the valve bore is shut off from both the atmosphere and the source of suction. This position varies with the pressure exerted by the operator on the pedal 23, so that the degree of braking is determined by the operator.

When the operator ceases to exert pressure on the pedal 23 the light spring 64 returns the slide valve spool 46 to its normal position, so that both ends of the servo-motor 17 are connected to suction, and the piston 29 is returned by the return spring 30. The aperture 27 in the piston 26 is therefore opened, the piston 26 is returned by the customary return spring, and the brakes are released, the reaction plunger 56 returning to its normal position.

The relation between the pressure in the servo-operated master cylinder 16 and the pressure produced in the master cylinder 22 by the operator depends on the relative areas of the reaction plunger 56 and the smaller-diameter part 51 of the slide-valve spool 46.

It will be understood that the operator-operated master cylinder may be operated by a hand-lever instead of a pedal, and that any number of brakes may be operated by the system. The shoe brakes described and illustrated may be replaced by disc brakes, and the system may be used for operating devices other than brakes.

I claim:

1. In a servo-assisted liquid pressure system including in combination a servomotor, a master cylinder actuated thereby and a control valve for the servomotor, the improved valve for controlling the servomotor which comprises a piston-type slide valve spool, a valve body defining a bore adapted to receive said valve spool for reciprocation therein, a passage in said valve body for admitting a fluid under pressure to urge said valve spool in a first direction when pressure is applied to the liquid pressure system by an operator-operated master cylinder, a reaction plunger located in said bore and adapted to apply a thrust to the slide valve spool in the opposite direction, a light spring disposed between the slide valve spool and the reaction plunger, means to connect the liquid pressure system to the reaction plunger and a stronger spring operatively connected to the reaction plunger to oppose the liquid pressure thereon.

2. A valve according to claim 1, wherein the slide valve spool is formed with a reduced portion at one end, the said reduced portion extending through a fluid-tight packing into a cylinder adapted to be connected to the operator-operated master cylinder.

3. A valve according to claim 2, wherein the slide valve spool is mounted in a valve bore in which are formed first, second and third axially spaced circumferential grooves adapted to be connected respectively to the atmosphere, to the end of the cylinder of the servo-device in which atmospheric pressure acts, and to a source of suction, the slide valve controlling the intercommunication of the grooves so that the second groove is in communication selectively with one of the remaining grooves and is cut off from the other one of said grooves.

4. A valve according to claim 1, wherein the slide valve spool is tubular, the bore therethrough being closed at the end on which the pressure in the operator-operated master cylinder acts, the stronger spring being accommodated, at least in part, in the bore of said valve spool.

References Cited in the file of this patent

UNITED STATES PATENTS

| 2,260,490 | Stelzer | Oct. 28, 1941 |
| 2,289,043 | Rockwell | July 7, 1942 |
| 2,383,682 | Price | Aug. 28, 1945 |
| 2,853,977 | Sadler | Sept. 30, 1958 |
| 2,878,647 | Schultz | Mar. 24, 1959 |